May 16, 1967  N. R. SCHWARTZ  3,319,982
LOCKABLE SWIVEL ASSEMBLY
Filed Sept. 2, 1964  2 Sheets-Sheet 1
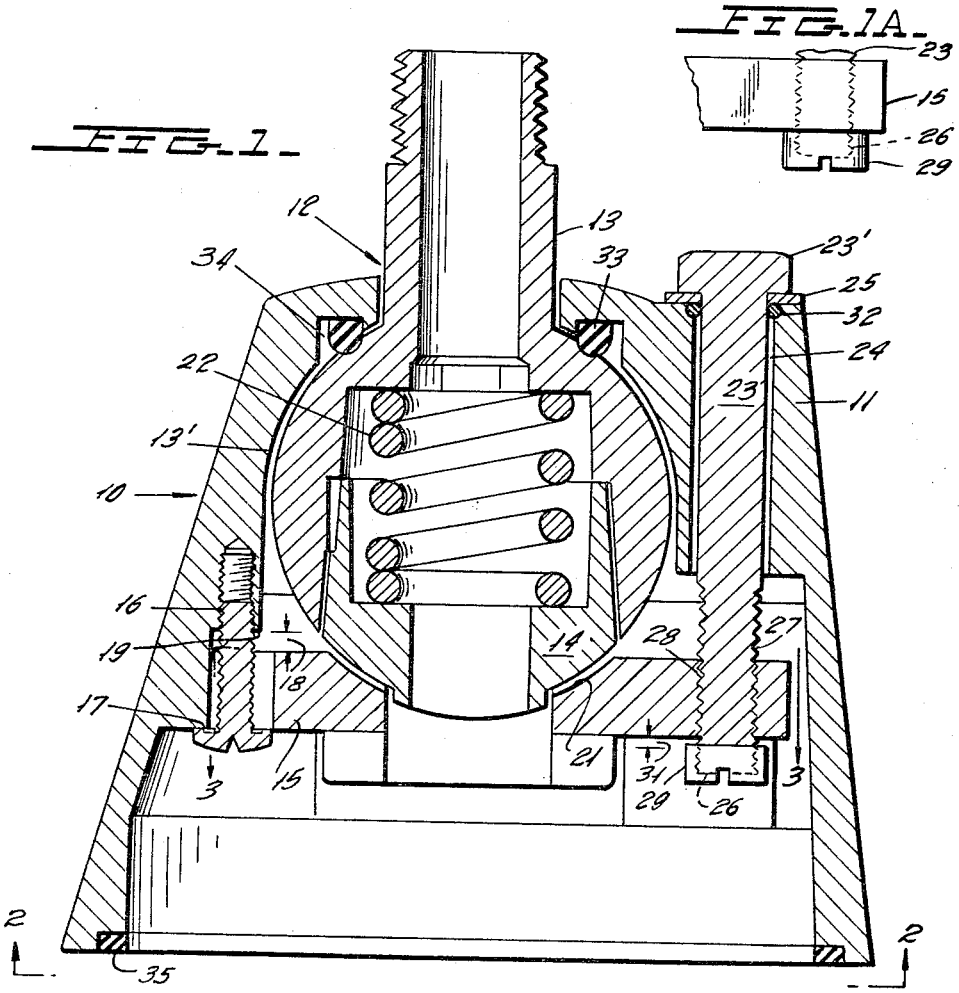
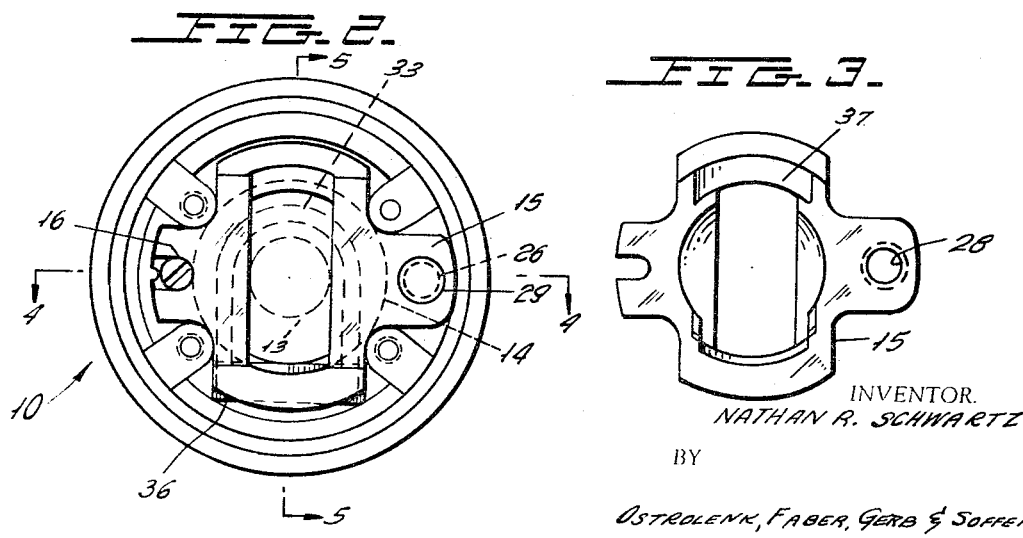
INVENTOR.
NATHAN R. SCHWARTZ
BY
OSTROLENK, FABER, GERB & SOFFEN
ATTORNEYS May 16, 1967   N. R. SCHWARTZ   3,319,982
LOCKABLE SWIVEL ASSEMBLY
Filed Sept. 2, 1964   2 Sheets-Sheet 2
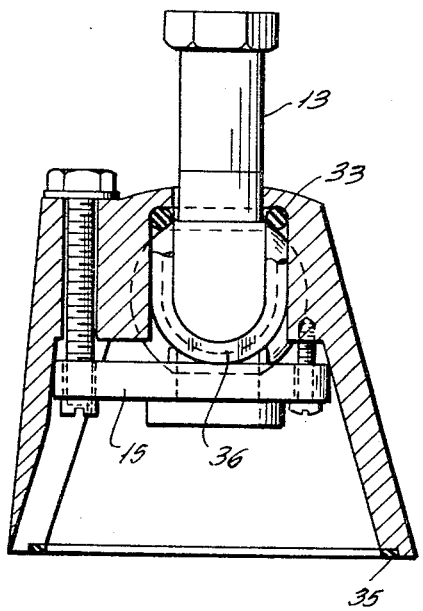
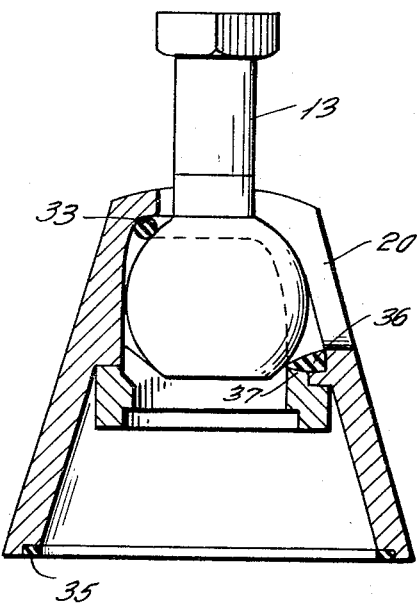
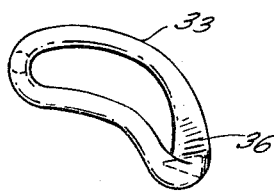
INVENTOR.
NATHAN R. SCHWARTZ
BY
OSTROLENK, FABER, GERB & SOFFEN
ATTORNEYS

United States Patent Office 3,319,982
Patented May 16, 1967

3,319,982
LOCKABLE SWIVEL ASSEMBLY
Nathan R. Schwartz, Yonkers, N.Y., assignor to Swivelier Company, Inc., Nanuet, N.Y., a corporation of New York
Filed Sept. 2, 1964, Ser. No. 393,833
1 Claim. (Cl. 287—12)

This invention relates to a lockable swivel assembly, and more particularly to such an assembly which may be adjusted to permit rotation of a lighting fixture or the like about diverse axes or locking of the same at any predetermined angle.

It is among the objects of this invention to provide a swivel assembly having a convenient and yet effective locking mechanism facilitating adjustment of the swivel to permit rotation thereof or, if desired, to lock the same in a predetermined position.

A further object of the invention is to provide such an assembly including mechanism preventing disengagement of the locking member from the swivel assembly.

An additional object is to provide a construction which may be associated with such assembly and which serves to provide a weatherproof seal therefor.

In accordance with the invention, a lockable swivel assembly is provided comprising a hollow top shell, a swivel ball unit received in the top shell and including a ball and nipple segment and a ball segment coating therewith, a cup washer pivoted on the top shell for biasing the ball segment of the swivel ball unit against the cooperating ball and nipple segment thereof, and an adjustable locking means secured to the cup washer for adjusting the pressure of such washer on the swivel ball unit. The locking mechanism hereof includes a lock bolt having a first end portion engaging the top shell and a second, threaded end portion extending through and threadingly engaged with the cup washer. By tightening the lock bolt, the pressure of the cup washer on the swivel ball unit is increased to prevent rotation and effect locking of the swivel assembly. On the other hand, when the lock bolt is loosened, the pressure of the cup washer on the swivel ball unit is decreased, thereby facilitating movement thereof.

According to a further feature of the invention, a threaded sleeve is provided engaging the threaded end of the lock bolt adjacent the cup washer (on the side of the cup washer remote from the bolt head), spaced from the washer such that when the lock bolt is loosened the threaded sleeve is simultaneously tightened until it bears against the cup washer. In this manner the extent to which the lock bolt may be loosened is controlled, the binding effect produced between the threaded sleeve and the cup washer preventing disengagement of the lock bolt from the cup washer and top shell of the swivel assembly.

The nature and objects of the present invention will be more fully apparent from the following detailed description of a preferred embodiment thereof, taken together with the accompanying drawing in which:

FIGURE 1 is an enlarged vertical cross section through a lockable swivel joint assembly provided in accordance with the invention;

FIGURE 1A is a fragmentary view of a portion of the device illustrated in FIGURE 1, showing the threaded sleeve for the lock bolt binding against the cup washer of the assembly when the lock bolt has been rotated into its open or loosened position;

FIGURE 2 is a bottom plan view, viewed in the direction of line 2—2' in FIGURE 1 but taken on a smaller scale than FIGURE 1, showing the configuration of the cup washer and locking mechanism of the assembly;

FIGURE 3 is a plan view of the cup washer, showing the side of the cup washer opposite from that illustrated in FIGURE 2;

FIGURE 4 is a vertical section taken along the line 4—4 in FIGURE 2 with the assembly inverted with respect to the position illustrated in FIGURE 1, illustrating the gasket providing a weatherproof seal adjacent the groove in the top shell through which the nipple portion of the swivel assembly extends;

FIGURE 5 is a vertical section taken at right angles to the view shown in FIGURE 4, along the line 5—5 of FIGURE 2; and FIGURE 6 is a perspective view of the sealing gasket component of the swivel assembly.

Referring to the drawings, a swivel assembly 10 is illustrated comprising a hollow swivel housing or top shell 11 receiving a swivel ball unit indicated generally at 12 in FIGURE 1. The top shell 11 may be connected in the conventional manner to a light socket and shade assembly, for example, with the swivel ball unit mounted to a supporting canopy, to provide a swivel-type lighting fixture.

The swivel ball unit includes a ball and nipple segment 13 (the nipple of which may be secured by a suitable adapter to a supporting canopy), and a cooperating ball segment 14. The ball and nipple segment 13 is received within a mating recess formed in the top shell 11, bearing against an internal seating surface 13' therefor.

A stop provided between the ball and nipple segment 13 and the cooperating ball segment 14 limits the movement of the swivel ball unit to approximately 350° (to prevent excess twisting of the wires extending therethrough, when the swivel ball unit is incorporated in a swivel-type lighting fixture).

The nipple portion of segment 13 (which may or may not be integral with the ball portion thereof) extends through an elongated slot 20 in the top shell 11.

The ball and nipple segment is thus designed to rotate about 350° with respect to a first axis, relative to the top shell and to pivot substantially 90° (through groove 20) with respect to a second axis at right angles to the first. The configuration of the respective segments of the swivel ball unit and the cup washer therefor, discussed hereinafter, permits such bending of the swivel assembly, while allowing sufficient room for the electrical wires extending therethrough.

An adjustable cup washer 15 is pivotally mounted to the top shell 11 by means of a screw 16 mounted adjacent the shoulder 17 of the top shell 11 and cup washer and the top shell. A gap 18 is provided between the cup washer 15 and an internal shoulder 19 of the top shell to permit pivotal movement of the cup washer in response to the locking mechanism described hereinafter.

The locking mechanism secured to the cup washer for adjusting the force exerted thereby upon the swivel ball unit includes a lock bolt 23 extending through an aperture 24 provided in the top shell 11 and terminating at one end in a shouldered end portion or head 23' engaging a washer 25 seated on an outer surface of the top shell 11. The opposite end 26 of the lock bolt is threaded as at 27 and is engaged in a threaded aperture 28 extending through cup washer 15. A threaded sleeve 29 is mounted on the end 26 of lock bolt 23, spaced by a distance 31 from the cup washer 15 when the lock bolt is in its fully tightened position shown in FIGURE 1.

When it is desired to lock the swivel assembly against movement, the lock bolt is tightened as illustrated, increasing the pressure exerted by cup washer 15 on the swivel ball unit 12 and thereby preventing relative motion between the swivel ball unit and the top shell 11, and effecting locking of the assembly. When it is desired to loosen the lock bolt to permit relative rotation between the parts, the lock bolt 23 is loosened, decreasing the pressure on the cup washer and permitting relative movement between the swivel ball unit and the top shell.

It will be noted that as the lock bolt is thus loosened the threaded sleeve 29 is simultaneously tightened on the end 26 of the bolt. Thus, when the bolt 23 reaches its ultimate open or loosened position, the sleeve 29 bears against the adjacent surface of cup washer 15 (FIGURE 1A). By thus bottoming the sleeve against the cup washer the lock bolt is caused to bind so that it cannot be unscrewed or otherwise disengaged from the cup washer. The sleeve 29 thus provides a convenient means for preventing disengagement of the lock bolt 23 from the swivel assembly.

Desirably, the lockable swivel assembly is weatherproofed by the provision of (a) an O-ring 32 positioned in the aperture 24 of the top shell 11, between lock bolt 23 and the walls of the top shell, by (b) a gasket 33 disposed in a groove 34 in the top shell between the ball and nipple segment 13 and the internal walls of the housing, and by (c) a further gasket 35 disposed at the bottom of the top shell 11, between the swivel assembly and a shade mounted thereto.

As shown in FIGURES 4, 5, and 6, the gasket 33 is a generally elliptical elastic member which fits about the neck of the nipple portion of the ball and nipple segment and abuts the edges of the elongated groove 20 in top shell 11. The gasket has a generally ring-shaped cross section, and includes a thickened portion 36, best shown in FIGURE 6. An upstanding ridge 37 of the cup washer 15 is adapted to press against the thickened portion 36 of gasket 33 (see FIGURE 5) when the cup washer engages the swivel ball unit within the top shell. The ridge 37, together with the peripheral walls of the swivel ball, press gasket 33 against the internal walls of top shell 11 to provide a weatherproof seal adjacent the elongated groove 20 in the top shell within which the ball and nipple segment is movable.

The tight contact between the swivel ball unit and the interior walls of the top shell insures a weatherproof seal between the gasket 33 and the swivel unit, and the O-ring provides further protection against leakage through the aperture in which the lock bolt 23 is received. It will however, be noted that the O-ring 32 and gasket 33 are not essential components of the swivel assembly of the invention, and may be omitted if desired.

It will thus be noted that the locking mechanism hereof provides a convenient means for adjusting the tension of the cup washer upon the swivel ball unit to either permit free rotation of the swivel ball relative to the top shell, to impose a substantial frictional drag upon such rotation, or alternatively, to lock the swivel ball unit relative to the top shell and thereby fix the assembly in any predetermined angular and rotational orientation.

As noted hereinabove, the screw 16 may be replaced by a suitable boss pivoting the cup washer against the swivel ball unit, the compression spring 22 may be eliminated and the O-ring 32 and gaskets 33 and 35 may, if desired, be omitted from the swivel assembly.

Since these and other changes may be made in the embodiment of the invention described hereinabove without departing from the scope thereof, it is intended that the preceding description shall be interpreted as illustrative and not in a limiting sense.

I claim:

A weatherproof, lockable swivel assembly comprising:

(a) a hollow shell for said assembly having an elongated groove extending therethrough and an internal, generally spherically shaped seating surface formed therein;

(b) a swivel ball unit received in said top shell including a ball and nipple segment, the nipple portion of which extends through the groove in said top shell for pivotal movement therethrough; a ball segment; and a compression spring urging the ball and nipple segment and the ball segment away from one another toward the sperical seating surface defined by the internal walls of said top shell, and the cup washer defined hereinafter, respectively;

(c) an adjustable cup washer biasing the ball segment against the ball and nipple segment of the swivel ball unit;

(d) a screw loosely securing the cup washer to the top shell and permitting pivotal movement of the cup washer with respect thereto;

(e) adjustable locking means secured to the cup washer for adjusting the force exerted thereby on the swivel ball unit, said locking means including (1) a lock bolt having a first end portion engaging said top shell and a second, threaded end portion extending through and threadingly engaged with said cup washer, and (2) a threaded sleeve engaging the threaded end of the lock bolt on the side of the cup washer remote from the first end portion of said bolt;

(f) a resilient gasket mounted within said top shell and disposed between the walls of said top shell defining said elongated groove and the surfaces of said ball and nipple segment adjacent thereto; and (g) means on said cup washer biasing said resilient gasket against the seating surface of said top shell and against the mating surface of said ball and nipple segment, respectively, to provide a weatherproof seal therebetween;

tightening of the lock bolt increasing the force exerted by the cup washer on the swivel ball unit to prevent rotation and effect locking thereof, and loosening of the lock bolt decreasing the force exerted by the cup washer on the swivel ball unit to facilitate rotation and pivotal movement thereof and simultaneously tightening said sleeve on the lock bolt until said sleeve binds against said side of the cup washer, preventing further loosening of the lock bolt and disengagement of said bolt from the cup washer and top shell of the assembly.

References Cited by the Examiner

UNITED STATES PATENTS

| | | | |
|---|---|---|---|
| 628,692 | 7/1899 | Campbell | 285—185 X |
| 1,532,195 | 4/1925 | Morrison | 285—267 |
| 2,089,463 | 8/1937 | Ritz-Woller | 287—21 |
| 2,424,897 | 7/1947 | Orshansky | 285—266 X |
| 2,477,762 | 8/1949 | Monroe | 285—266 X |
| 2,606,048 | 8/1952 | Jones | 287—21 |
| 2,935,348 | 5/1960 | Jones | 285—269 X |

EDWARD C. ALLEN, *Primary Examiner.*

THOMAS F. CALLAGHAN, *Examiner.*